(12) United States Patent
Lead

(10) Patent No.: US 10,174,136 B2
(45) Date of Patent: Jan. 8, 2019

(54) SEPARATION OF OIL-WATER MIXTURES USING NANOTECHNOLOGY

(71) Applicant: University of South Carolina, Columbia, SC (US)

(72) Inventor: Jamie R. Lead, Chapin, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 15/445,020

(22) Filed: Feb. 28, 2017

(65) Prior Publication Data

US 2017/0247481 A1    Aug. 31, 2017

Related U.S. Application Data

(60) Provisional application No. 62/300,975, filed on Feb. 29, 2016.

(51) Int. Cl.

| C08F 26/10 | (2006.01) |
|---|---|
| C08F 8/42 | (2006.01) |
| B01D 17/02 | (2006.01) |
| E02B 15/10 | (2006.01) |
| B01D 17/04 | (2006.01) |
| C02F 1/28 | (2006.01) |
| C02F 101/32 | (2006.01) |
| C02F 103/00 | (2006.01) |
| C02F 1/48 | (2006.01) |

(52) U.S. Cl.
CPC ............ *C08F 8/42* (2013.01); *B01D 17/0202* (2013.01); *B01D 17/047* (2013.01); *C02F 1/288* (2013.01); *E02B 15/10* (2013.01); *C02F 1/488* (2013.01); *C02F 2101/32* (2013.01); *C02F 2103/007* (2013.01); *C02F 2305/08* (2013.01); *Y02A 20/204* (2018.01)

(58) Field of Classification Search
CPC ..... C08F 26/10; C08F 126/10; C08F 2500/24
See application file for complete search history.

(56) References Cited

U.S. PATENT DOCUMENTS

| 9,835,628 B2 | 12/2017 | Lead et al. | |
|---|---|---|---|
| 2008/0034921 A1* | 2/2008 | Vanheusden | B22F 1/0022 75/362 |
| 2009/0246143 A1 | 10/2009 | Bonitatibus et al. | |
| 2015/0298993 A1 | 10/2015 | Lead | |

(Continued)

FOREIGN PATENT DOCUMENTS

WO    WO 2018/106791    6/2018

OTHER PUBLICATIONS

Wang, Journal of Magnetism and Magnetic Materials, vol. 340 (2013), pg. 57-60 (Year: 2013).*

(Continued)

*Primary Examiner* — Robert C Boyle

(74) *Attorney, Agent, or Firm* — Dority & Manning, P.A.

(57) ABSTRACT

Methods for making a plurality of nanoparticles are provided. The method may include flowing a first component of the core into a reaction chamber; flowing a polymeric material into the reaction chamber; and flowing a second component of the core into the reaction chamber such that the first component reacts with the second component to form a core. The polymeric material forms a polymeric shell around the core.

14 Claims, 13 Drawing Sheets

(56) References Cited

U.S. PATENT DOCUMENTS

2015/0309043 A1    10/2015    Lead et al.

OTHER PUBLICATIONS

Felton, Baths and Circulators, 2004 (Year: 2004).*
In Oil in the Sea III: Inputs, Fates, and Effects, Washington (DC), 2003.
MacDonald, I. R.; Leifer, I., Estimates of natural hydrocarbon flux in the Gulf of Mexico basin from remote sensing data. Geophysical Research Abstracts, vol. 7 2005, 09907, 2005.
Deep Water: the Gulf Oil Disaster and the Future of Offshore Drilling Washington D.C., 2014.
Zhu, Q.; Tao, F.; Pan, Q., Fast and selective removal of oils from water surface via highly hydrophobic core-shell Fe2O3@ C nanoparticles under magnetic field. ACS applied materials & interfaces 2010, 2, (11), 3141-3146.
Chen, M.; Jiang, W.; Wang, F.; Shen, P.; Ma, P.; Gu, J.; Mao, J.; Li, F., Synthesis of highly hydrophobic floating magnetic polymer nanocomposites for the removal of oils from water surface. Applied Surface Science 2013, 286, 249-256.
Lehr, B.; Bristol, S.; Possolo, A., The Federal Interagency Solutions Group. Oil Budget Calculator Science and Engineering Team. Oil Budget Calculator. Technical document http://www. restorethegulf. gov/sites/default/files/documents/pdf/OilBudgetCalc_Full_HQ-Print_ 111110. pdf 2010.
Wei, Q. F.; Mather, R. R.; Fotheringham, A. F.; Yang, R. D., Evaluation of nonwoven polypropylene oil sorbents in marine oil-spill recovery. Mar Pollut Bull 2003, 46, (6), 780-783.
Merkel, T. C.; Freeman, B. D.; Spontak, R. J.; He, Z.; Pinnau, I.; Meakin, P.; Hill, A. J., Ultrapermeable, reverse-selective nanocomposite membranes. Science 2002, 296, (5567), 519-522.
Nakazawa, M.; Somorjai, G. A., Coadsorption of water and selected aromatic molecules to model the adhesion of epoxy resins on hydrated surfaces of zinc oxide and iron oxide. Applied surface science 1995, 84, (3), 309-323.
Barron, M. G., Ecological impacts of the deepwater horizon oil spill: implications for immunotoxicity. Toxicologic pathology 2012, 40, (2), 315-320.
Korhonen, J. T.; Kettunen, M.; Ras, R. H.; Ikkala, O., Hydrophobic nanocellulose aerogels as floating, sustainable, reusable, and recyclable oil absorbents. ACS applied materials & interfaces 2011, 3, (6), 1813-1816.
Gui, X.; Cao, A.; Wei, J.; Li, H.; Jia, Y.; Li, Z.; Fan, L.; Wang, K.; Zhu, H.; Wu, D., Soft, highly conductive nanotube sponges and composites with controlled compressibility. ACS nano 2010, 4, (4), 2320-2326.
Yuan, J.; Liu, X.; Akbulut, O.; Hu, J.; Suib, S. L.; Kong, J.; Stellacci, F., Superwetting nanowire membranes for selective absorption. Nature Nanotechnology 2008, 3, (6), 332-336.
Zhu, L.; Li, C.; Wang, J.; Zhang, H. Zhang, J.; Shen, Y.; Li, C.; Wang, C.; Xie, A., A simple method to synthesize modified Fe 3 O 4 for the removal of organic pollutants on water surface. Applied Surface Science 2012, 258, (17), 6326-6330.
Kimata, M.; Nakagawa, D.; Hasegawa, M., Preparation of monodisperse magnetic particles by hydrolysis of iron alkoxide. Powder technology 2003, 132, (2), 112-118.
Chin, A. B.; Yaacob, I. I., Synthesis and characterization of magnetic iron oxide nanoparticles via w/o microemulsion and Massart's procedure. Journal of materials processing technology 2007, 191, (1), 235-237.
Palchoudhury, S.; Lead, J. R., A Facile and Cost-Effective Method for Separation of Oil-Water Mixtures Using Polymer-Coated Iron Oxide Nanoparticles. Environmental science & technology 2014, 48, (24), 14558-14563.
Mershahghassemi, S.; Lead, J. R., Oil Recovery from Water under Environmentally Relevant Conditions Using Magnetic Nanoparticles. Environmental Science & Technology 2015, 49, (19), 11729-11736.
Betke, A.; Kickelbick, G., Bottom-up, wet chemical technique for the continuous synthesis of inorganic nanoparticles. Inorganics 2014, 2, (1), 1-15.
Petschacher, C.; Eitzlmayr, A.; Besenhard, M.; Wagner, J.; Barthelmes, J.; Bernkop-Schnürch, A.; Khinast, J. G.; Zimmer, A., Thinking continuously: a microreactor for the production and scale-up of biodegradable, self-assembled nanoparticles. Polymer Chemistry 2013, 4, (7), 2342-2352.
Labson, V. F.; Clark, R. N.; Swayze, G. A.; Hoefen, T. M.; Kokaly, R.; Livo, K.; Powers, M. H.; Plumlee, G. S.; Meeker, G. P. Estimated minimum discharge rates of the Deepwater Horizon spill-interim report to the Flow Rate Technical Group from the Mass Balance Team; 2010.
Weber, C. I., Methods for measuring the acute toxicity of effluents and receiving waters to freshwater and marine organisms. Environmental Monitoring Systems Laboratory, Office of Research and Development, US Environmental Protection Agency: 1991.
Pantoja, P. A.; Lopez-Gejo, J.; Le Roux, G. A.; Quinn, F. H.; Nascimento, C. A., Prediction of crude oil properties and chemical composition by means of steady-state and time-resolved fluorescence. Energy & Fuels 2011, 25, (8), 3598-3604.
Ryder, A. G., Analysis of crude petroleum oils using fluorescence spectroscopy. In Reviews in Fluorescence 2005, Springer: 2005; pp. 169-198.
Hitchman, A.; Smith, G. H. S.; Ju-Nam, Y.; Sterling, M.; Lead, J. R., The effect of environmentally relevant conditions on PVP stabilised gold nanoparticles. Chemosphere 2013, 90, (2), 410-416.
Atlas, et al. "Oil Biodegradation and Bioremediation: A Tale of the Two Worst Spills in U.S. History," *Environmental Science & Technology* 45 (16), (2011), pp. 6709-6715.
Balnois, et al. "Atomic force microscopy of humic substances: Effects of pH and ionic strength," *Environmental Science & Technology* 33 (21), (1999), pp. 3911-3917.
Calcagnile, et al. "Magnetically Driven Floating Foams for the Removal of Oil Contaminants from Water," *ACS Nano* 6(6), (2012), pp. 5413-5419.
Chu, et al. "Three-Dimensionally Macroporous Fe/C Nanocomposites as Highly Selective Oil-Absorption Materials," *ACS Applied Materials & Interfaces* 4(5), (2012), pp. 2420-2425.
De Souza, et al. "A Magnetic Composite for Cleaning of Oil Spills on Water," *Macromolecular Materials and Engineering* 295(10), (2010), pp. 942-948.
DeLaune, et al. Projected Impact of Deepwater Horizon Oil Spill on U.S. Gulf Coast Wetlands. *Soil Science Society of America Journal* 75(5), (2011), pp. 1602-1612.
Deng, et al. "Hydrophobic Meshes for Oil Spill Recovery Devices," *ACS Applied Materials & Interfaces* 5(3), (2013), pp. 774-781.
Fontenot, et al. "An Evalutaion of Water Quality in Private Drinking Water Wells Near Natural Gas Extraction Sites in the Barnett Shale Formation," *Environmental Science & Technology* 47(17), (2013), pp. 10032-10040.
Gui, et al. "Magnetic and Highly Recyclable Macroporous Carbon Nanotubes for Spilled Oil Sorption and Separation," *Applied Materials & Interfaces* 5, (2013), pp. 5845-5850.
Hubbe, et al. "Cellulosic Substrates for Removal of Pollutants from Aqueous Systems: A Review. 3, Spilled Oil and Emulsified Organic Liquids," *BioResources* 8(2), (2013), pp. 3038-3097.
Kadar, et al. "The influence of engineered $Fe_2O_3$ nanoparticles and soluble ($FeCl_3$) iron on the developmental toxicity caused by $CO_2$-induced seawater acidification," *Environmental Pollution* 158(12), (2010), pp. 3490-3497.
Osborn, et al. "Methane contamination of drinking water accompanying gas-well drilling and hydraulilc fracturing," *Proceedings of the National Academy of Sciences of the United States of America* 108(20), (2011), pp. 8172-8176.
Pavi'a-Sanders, et al. "Robust Magnetic/Polymer Hybrid Nanoparticles Designed for Crude Oil Entrapment and Recovery in Aqueous Environments," *ACS Nano* 7(9), (2013), pp. 7552-7561.
Payne, et al. "Oil Spills Abatement: Factors Affecting Oil Uptake by Cellulosic Fibers," *Environmental Science & Technology* 46(14), (2012), pp. 7725-7730.
Reimer, et al. "Ferucarbotran (Resovist): a new clinically approved RES-specific contrast agent for contrast-enhanced MRI of the liver:

(56) References Cited

OTHER PUBLICATIONS properties, clinical development, and applications," *European Radiology* 13(6), (2003), pp. 1266-1276.

Rose, et al. "Drug Embedded PVP Coated Magnetic Nanoparticles for Targeted Killing of Breast Cancer Cells," Technology in Cancer Research and Treatment, (Mar. 2013), pp. 1-10.

Sun, et al. "Magnetically motive porous sphere composite and its excellent properties for the removal of pollutants in water by adsorption and desorption cycles," *Advanced Materials* 18(15), (2006), pp. 1968-1971.

Tejamaya, et al. "Stability of Citrate, PVP, and PEG Coated Silver Nanoparticles in Ecotoxicology Media," *Environmental Science & Technology* 46(13), (2012), pp. 7011-7017.

Thanikaivelan, et al. "Collagen based magnetic nanocomposites for oil removal applications," *Scientific Reports* 2(230), (2012), pp. 1-7.

Tri, Pham Minh. "Surface Functionalized Nano Magnetic Particles for Wastewater Treatment: Removal of Heavy Metal," National University of Singapore, Thesis (2008).

Venkatanarasimhan, et al. "Epoxidized natural rubber-magnetite nanocomposites for oil spill recovery," *Journal of Materials Chemistry A* 1(3), (2013), pp. 868-876.

Xia, et al. "Lessons from the Exxon Valdez Oil Spill disaster in Alaska," *Disaster Advances* 3(4), (2010), pp. 270-273.

Zhang, et al. "Superparamagnetic iron oxide nanoparticles prepared by using an improved polyol method," *Applied Surface Science* 266, (2013), pp. 375-379.

Zhang, et al. "Synthesis of PVP-coated ultra-small Fe3O4 nanoparticles as a MRI contrast agent," *J Mater Sci: Mater Med* 21, (2010), pp. 1205-1210.

\* cited by examiner

SEPARATION OF OIL-WATER MIXTURES USING NANOTECHNOLOGY

PRIORITY INFORMATION

The present application claims priority to U.S. Provisional Patent Application Ser. No. 62/300,975 titled "Separation of Oil-Water Mixtures Using Nanotechnology" of Lead filed on Feb. 29, 2016, the disclosure of which is incorporated by reference herein.

BACKGROUND

Oil contamination generally occurs when oil is released in to the environment from different sources such as natural seeps, extraction and transportation of petroleum including leaking vessels, drilling rigs, offshore oil platforms, and consumption of petroleum. The estimated amount of oil released to environment from various spills is 700,000 tons per year worldwide. In the Gulf of Mexico alone, the estimated average rate of seepage is 140,000 per year. Most frequent oil spills are small spills. However, some oil spills are much larger such as BP Deepwater Horizon oil spill (April 2010) that produced estimated total discharge of 670000 tons within a span of 3 months. Since oil spills and other related contamination can have catastrophic environmental consequences and current removal methods are limited, an improved removal of oil is urgently required. Traditional mechanical removal methods such as booms, skimmers, and suctions pumps have low removal efficiency and are effective only for thick oil slicks during the initial stage of oil spill. For low concentration of oil as present in the sheens of thickness <50 μm, various sorbent materials such as membranes, chemical dispersants, and polymer based foam absorbents are used for oil water separation. Although widely applied, these techniques are often impractical due to the limitations such as high operational cost and time, low adsorption efficiency, and environmental constraints.

Nanotechnology has gained significant research interest in the field of oil remediation in recent years and hydrophobic nanomaterials including hydrogels, nanotube sponges, nanowires, and nanoparticles have been widely studied. Despite showing good oil removal efficiency, these hydrophobic nanomaterials also have limitations in their practical applicability for oil-water separation in the depth of oil slicks. Moreover, many current methods use and produce hazardous materials using complex synthesis process with high energy and materials input. In our previous work, we developed a facile, and cheap synthesis technique to produce water soluble PVP-coated iron oxide NPs and applied these NPs for 100% oil removal at laboratory scale, as discussed in U.S. Publication 2015/0298993 of Jamie Lead published Oct. 22, 2014, which is incorporated by reference herein. However, successful transfer from lab- to industrial scale is essential for bringing a product to the market and to use them in large scale in-situ oil remediation. To illustrate this, to remove oil from the spill as big as BP Deepwater Horizon, this current method requires <106 Kg of the nanomaterials, assuming that each NP can sorb 30 times its mass.

Thus, an improved method for forming such nanoparticles is desired in the art, particularly for large mass quantities (>Kg).

SUMMARY

Objects and advantages of the invention will be set forth in part in the following description, or may be obvious from the description, or may be learned through practice of the invention.

Methods are generally provided for making a plurality of nanoparticles. In one embodiment, the method comprises: flowing a first component of the core into a reaction chamber; flowing a polymeric material into the reaction chamber; and flowing a second component of the core into the reaction chamber such that the first component reacts with the second component to form a core. The polymeric material forms a polymeric shell around the core.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures.

DEFINITIONS

Figure 1A:
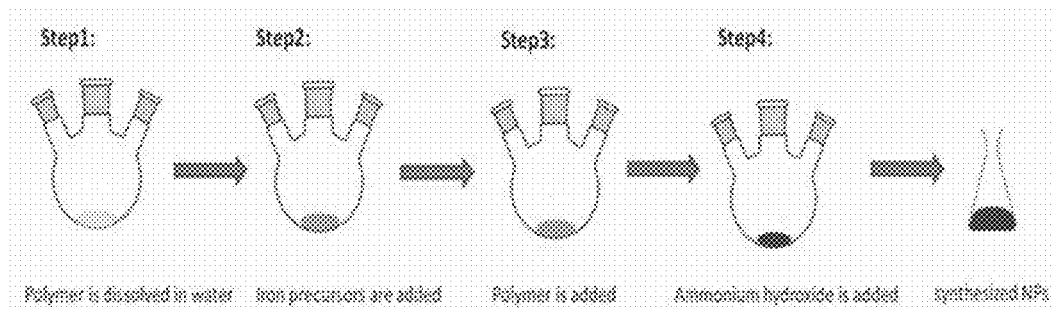
FIG. 1a shows a step-by-step method of synthesizing an exemplary nanoparticle via a batch process in a laboratory scale.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, the prefix "nano" refers a scale of about 1 nm to about 100 nm. For example, particles having an average diameter on the nanometer scale (e.g., from about 1 nm to about 100 nm) are referred to as "nanoparticles". Particles having an average diameter of greater than 1,000 nm (i.e., 1 µm) are generally referred to as "microparticles", since the micrometer scale generally involves those materials having an average size of greater than 1 µm.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "oil" generally refers to any liquid not miscible with water, and specifically to liquids that include hydrocarbons of various molecular weights and other organic compounds.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

A continuous flow-through synthesis technique is generally provided to produce NPs (e.g., PVP-coated iron oxide NPs) under ambient condition. The continuous flow-through synthesis can lead to a large scale production of iron oxide NPs. This continuous flow-through synthesis technique is more efficient and commercially viable than any previously used 'one-pot' batch process, such as described in U.S. patent application Ser. No. 14/627,056 of Lead, et al., which is incorporated by reference herein. In one embodiment, the continuous flow-through synthesis technique is used to produce polyvinylpyrrolidone (PVP)-coated iron oxide nanoparticles (NPs) in large scale. The continuous flow-through synthesis is scaled up in a massively parallel process to produce large amounts. A comparative study between NPs from flow-through synthesis and batch process was conducted on the particle structure properties and oil removal efficiency. Generally, it was found that NPs from flow-through synthesis largely maintained the structural properties and were as efficient as NPs from batch process in terms of oil remediation. Structural property analysis showed that NPs produced from flow-through synthesis largely maintained their structural properties. The result from oil remediation experiments in synthetic sea-water with or without fulvic acid (FA) or alginic acid (AA) indicated that NPs synthesized from flow-through technique showed excellent oil removal capacity (about 100% removal) and their oil removal efficiency was comparable to the efficiency of the NPs synthesized from batch method. Comparable results were obtained from experiments in other systems representative of natural waters. FA and AA are representative natural organic macromolecules present in natural waters such as sea water.

Figure 1B:
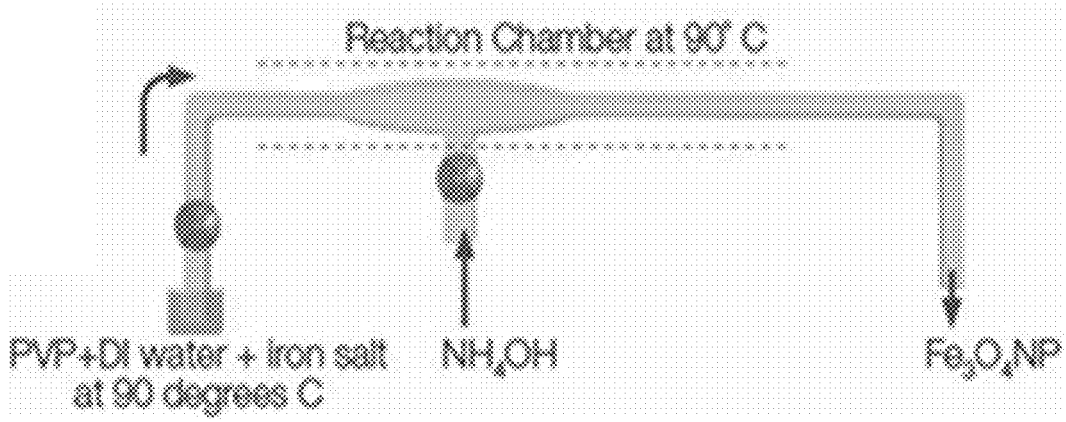
FIG. 1b shows a large scale method of synthesizing an exemplary nanoparticle via a flow-through process in an on-going large scale manufacturing method.

Generally, a schematic of a typical flow-through synthesis is shown in FIG. 1b. In the exemplary flow-through method, the polymeric material, a first component of the nanoparticle core, and a second component of the nanoparticle core are supplied into the reaction chamber at an elevated temperature (e.g., about 60° C. to about 120° C., such as about 80° C. to about 100° C.) to form the core-shell nanoparticle. As shown in FIG. 1b, the polymeric material (represented in FIG. 1b as "PVP" as an exemplary polymeric material) and a first component of the nanoparticle core (represented in FIG. 1b as an iron salt) are supplied together to the reaction chamber in a carrying fluid (represented as deionized (DI) water). Separately, a second component of the nanoparticle core (represented in FIG. 1b as $NH_4OH$) is supplied to the reaction chamber.

In the reaction chamber, the first and second components react together to form the nanoparticle core (e.g., an iron oxide nanoparticle core) as a precipitant out of the carrying fluid, which allows the polymeric material to form a shell around the precipitated nanoparticle core. These reactions occur in the carrying fluid, which has a flow rate tailored to keep the reactants within the reaction chamber for a suitable time. The resulting iron oxide NPs, which are coated with the polymeric shell, were washed once with deionized water and magnetically separated and redispersed in water again via sonication.

I. Nanoparticle Core

The presently disclosed methods can be utilized on a variety of different types of nanoparticle cores. The nanoparticle may comprise, for example, natural or synthetic nanoclays (including those made from amorphous or structured clays), inorganic metal oxides, nanolatexes, etc. Particularly suitable nanoparticle cores include inorganic nanoparticles, such as iron oxide, silica, alumina, a titanium oxide, indium tin oxide (ITO), CdSe, etc., or mixtures thereof. The nanoparticle core can, in one embodiment, be a core-shell nanoparticle itself. For example, the nanoparticle core can include a core of a first metal (e.g., a Au core) with a shell of a second metal (e.g., a silver shell).

In one embodiment, the nanoparticle core can be a metal oxide nanoparticle core, such as an iron oxide, silica, an aluminum oxide (e.g., alumina), a copper oxide, a zinc oxide, indium tin oxide, a titanium oxide, nickel oxides, cobalt oxides, or mixtures thereof. Such metal oxides can be in any form of the combination of the metal, oxygen, and optionally another element (e.g., another metal). For example, suitable iron oxides can include iron(II) oxide (FeO), iron(II,III) oxide ($Fe_3O_4$ or $Fe_4O_5$), iron(III) oxide ($Fe_2O_3$), etc. The method is particularly suitable for iron oxide nanoparticles, for use as the core in the resulting coated nanoparticle, can have a diameter between about 1 nm and about 100 nm, and can be formed primarily of magnetite ($Fe_3O_4$) and its oxidized form maghemite ($\gamma$-$Fe_2O_3$). Such iron oxide cores have superparamagnetic properties (a.k.a., SPIONs) that can be particularly suitable for certain embodiments. Similarly, suitable titanium oxides can include titanium dioxide ($TiO_2$), titanium(II) oxide (TiO), titanium(III) oxide ($Ti_2O_3$), etc. Likewise, suitable copper oxides can include cuprous oxide ($Cu_2O$), cupric oxide (CuO), etc.

In one embodiment, the metal oxide can be formed from reacting a first component with a second component within the reaction chamber. When forming a metal oxide, for example, the first component can be a metal salt (e.g., an iron source, such as an iron chloride salt) and the second component can be an oxygen source (e.g., ammonium hydroxide). The polymeric material and a first component of the nanoparticle core can be supplied together to the reaction chamber in a carrying fluid, while the second component of the nanoparticle core can be supplied separately into the reaction chamber (e.g., a gas).

In one particular embodiment, the core can be magnetic (e.g., a magnetite iron oxide core) to allow for separation/removal/extraction of the nanoparticle from the multiphasic liquid utilizing a magnetic force. Of course, other suitable magnetic materials can be utilized, such as nickel oxides, cobalt oxides, etc.

The core can, in certain embodiments, have an average diameter of about 100 nm or less (e.g., about 5 nm to about 100 nm), such as about 15 nm to about 50 nm. Such a relatively small size ensures a high specific surface area for the polymer shell to create sufficient oil adsorption capabilities.

The core can be made up of a single nanoparticle or an agglomeration/aggregation of nanoparticles. As such, the core may have a size of about 15 nm to about 50 nm when relatively few nanoparticles form the core (e.g., 1 to about 10 nanoparticles), or can be larger when the core is formed from a larger agglomeration of nanoparticles (e.g., having a core size of about 50 nm to about 500 nm formed from a plurality of nanoparticles). Agglomeration is increased somewhat in the presence of oil and in high ionic strength solutions. More scientifically, the core can be made of a single crystal (i.e., regular 3D arrangements of atoms), particles (single crystal or multiple crystals), or particles formed from agglomerates or aggregates (weakly and strongly bound).

II. Polymeric Nanoparticle Shell

A polymeric nanoparticle shell is generally positioned around the nanoparticle core, so as to form a core-shell nanoparticle. The polymeric nanoparticle shell can be formed around a core formed from a single nanoparticle or an agglomeration of nanoparticles. In one particular embodiment, the polymeric sheath can have a thickness of about 1 nm to about 50 nm on the core. The polymeric sheath may be chemically bonded to the core, and/or may be mechanically bonded around the core depending on the interaction between the particular polymeric material utilized and the particular core present.

The polymeric nanoparticle shell is generally formed from a polymeric material that comprises at least one polymer. In one embodiment, the polymeric nanoparticle shell can include a polyvinylpyrrolidone-based polymer (e.g., a PVP-based polymer), either alone or in a polymeric matrix with another polymer. For example, a PVP-based polymer can be at least 50% by weight of the polymeric material of the polymeric shell, such as about 75% to 100% by weight. In one embodiment, the PVP-based polymer can be at least 90% by weight of the polymeric material of the polymeric shell, such as about 95% to 100% by weight. The PVP-based polymer can be polyvinylpyrrolidone (PVP) or a polyvinylpyrrolidone derivative having the core backbone based on the PVP polymeric structure.

The PVP-based polymers can have, in particular embodiments, a molecular mass of about 10 kDa to about 360 kDa, with the lower end of the range being most effective for oil adsorption (e.g., about 10 kDa to about 200 kDa).

The PVP-based polymer can be utilized alone (i.e., without another polymeric material) to form the sheath, or can be utilized in a mixture with another polymeric material. For example, any polymer having aliphatic and aromatic structures similar to hydrocarbons can be mixed with the PVP-based polymer to for the sheath. In one embodiment, vitamins can be included within the polymeric material to prevent sorption (and loss) of fat soluble vitamins. Such an embodiment may be particularly useful for a gut fluid. In one embodiment, the PVP coating can be formed through a reaction process utilizing an aqueous solvent and at reaction temperatures of less than about 100° C. (e.g., about 60° C. to about 95° C.). The advantages of using the (1) aqueous solvent and (2) the lower reaction temps allows for the reaction to be more environmentally friendly in that no organic solvents are utilized (which also reduces cost).

III. Oil Removal

Methods are also generally provided for using nanoparticles to quantitatively remove oil from a multiphasic liquid (e.g., an oil-water mixture). The application is potentially suitable for oil recovery after spills and discharges and also for removing oils from other liquids e.g. edible oils from gastro-intestinal fluids. Subsequent recovery of the oil is feasible. Also, methods are generally provided for forming nanoparticles that are configured to quantitatively remove oil from oil-water mixtures.

Generally, these methods are directed to oil removal, not oil dispersion, with the potential for oil recovery and while utilizing low toxicity nanomaterials that can be formed through a facile, cheap synthesis process using low energy and material inputs. The presently disclosed methods work at oil concentrations relevant to oils spills, and work effectively under environmental conditions including seawater salinity and the presence of natural organic macromolecules such as humic substances (HS, similar to FA). Through the presently disclosed methods, nearly 100% oil removal can be achieved within 40-60 minutes of contact with the mixture, in particular embodiments. Finally, the methods are generally resistant to dynamic changes in the environment due to oxidation, sulfidation, aggregation and eco-corona formation.

Figure 7:
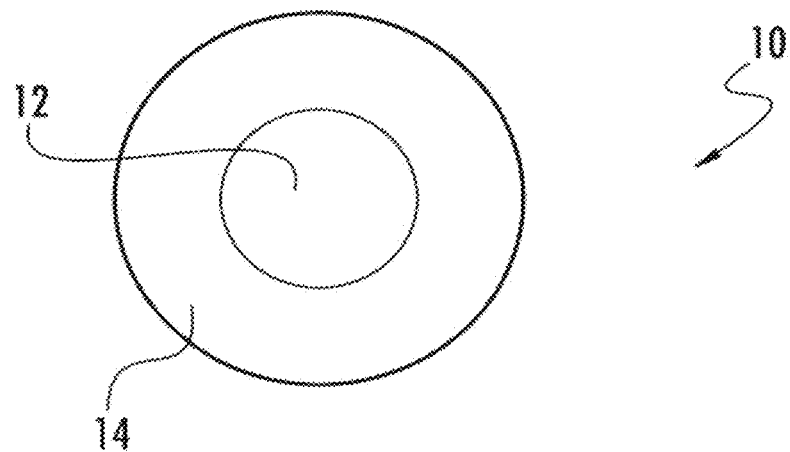
FIG. 7 shows an exemplary nanoparticle having a core surrounded by a polymeric shell.
Figure 8:
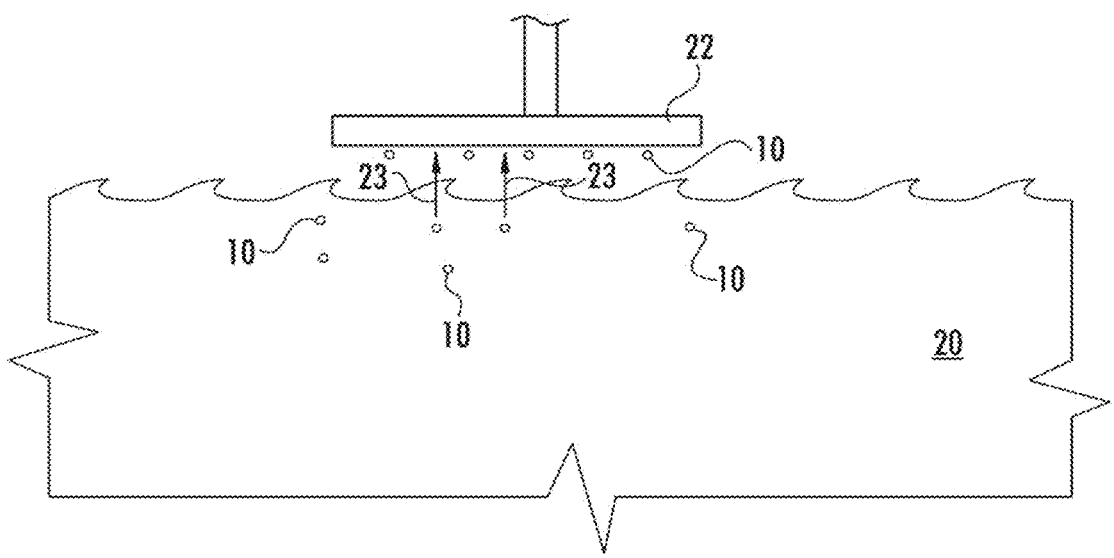
FIG. 8 shows a magnet removing nanoparticles from a multiphasic liquid.

The nanoparticles are generally formed from a core and polymeric shell, which are each discussed in greater detail below. Referring to FIG. 7, an exemplary nanoparticle 10 is shown having a core 12 surrounded by a polymeric shell 14. Although shown as a spherical nanoparticle 10, it is to be understood that the nanoparticle 10 can take on any suitable shape (e.g., nanoflake, nanorod, etc.).

IV. Separation of Oil from the Multiphasic Liquid

A plurality of the nanoparticles, such as those described above, are generally introduced to the multiphasic liquid such that the oil in the multiphasic liquid is allowed to be adsorbed by the polymeric shell of the nanoparticles.

In one embodiment, the nanoparticles can be added into (e.g., floated on, submerged within, dispersed and/or suspended therein, etc.) the multiphasic liquid. Such an introduction of the nanoparticles to the multiphasic liquid can be particularly useful in large, natural bodies of water (e.g., an ocean, gulf, lake, river, groundwater, etc.). For example, a large plurality of nanoparticles can be introduced to an area of an oil spill in a natural body of water. Then, after a sufficient contact time to allow the multiphasic liquid to be adsorbed by the polymeric shell, the nanoparticles can be removed from the multiphasic liquid. For example, the multiphasic liquid can be passed through a filter to remove the nanoparticles. Alternatively, if using a nanoparticle having a magnetic core, the multiphasic liquid can be exposed to a magnetic field to remove the nanoparticles. For example, a magnet can be placed near the multiphasic liquid with the nanoparticles such that the nanoparticles are magnetically attracted to the magnet and removed from the multiphasic liquid. The nanoparticles can also be physically or chemically bound to a surface, such that removal of the surface will remove the nanoparticles and associated oil.

Figure 2:
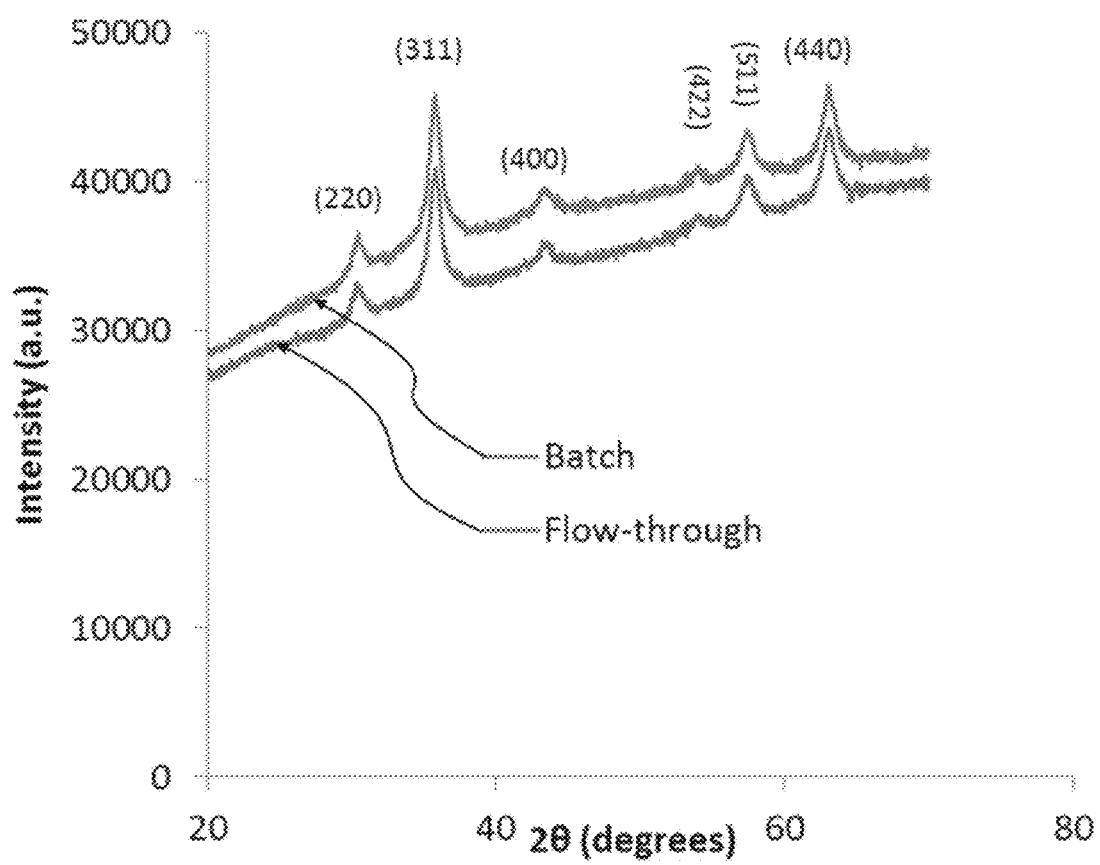
FIG. 2 shows a XRD patterns of as-prepared iron oxide NPs according to the Examples, comparing NPs from a batch process (as in FIG. 1a) to NPs from flow-through synthesis (as in FIG. 1b).

Referring to FIG. 2, an exemplary magnet 22 is shown in close proximity to the multiphasic liquid 22 to remove nanoparticles 10 therefrom, utilizing a magnetic force (shown as arrows 23). Of course, the magnet 22 can be placed into the multiphasic liquid 20 (e.g., on the surface of, submerged under, etc.) to collect the nanoparticles 10 from the multiphasic liquid 22. When utilized in a large body of water (e.g., the ocean, gulf, lake, river, groundwater, etc.), the magnet 22 can be suspended from a boat, helicopter, buoy etc. in order to collect the nanoparticles 10 from the multiphasic liquid 22.

Figure 9:
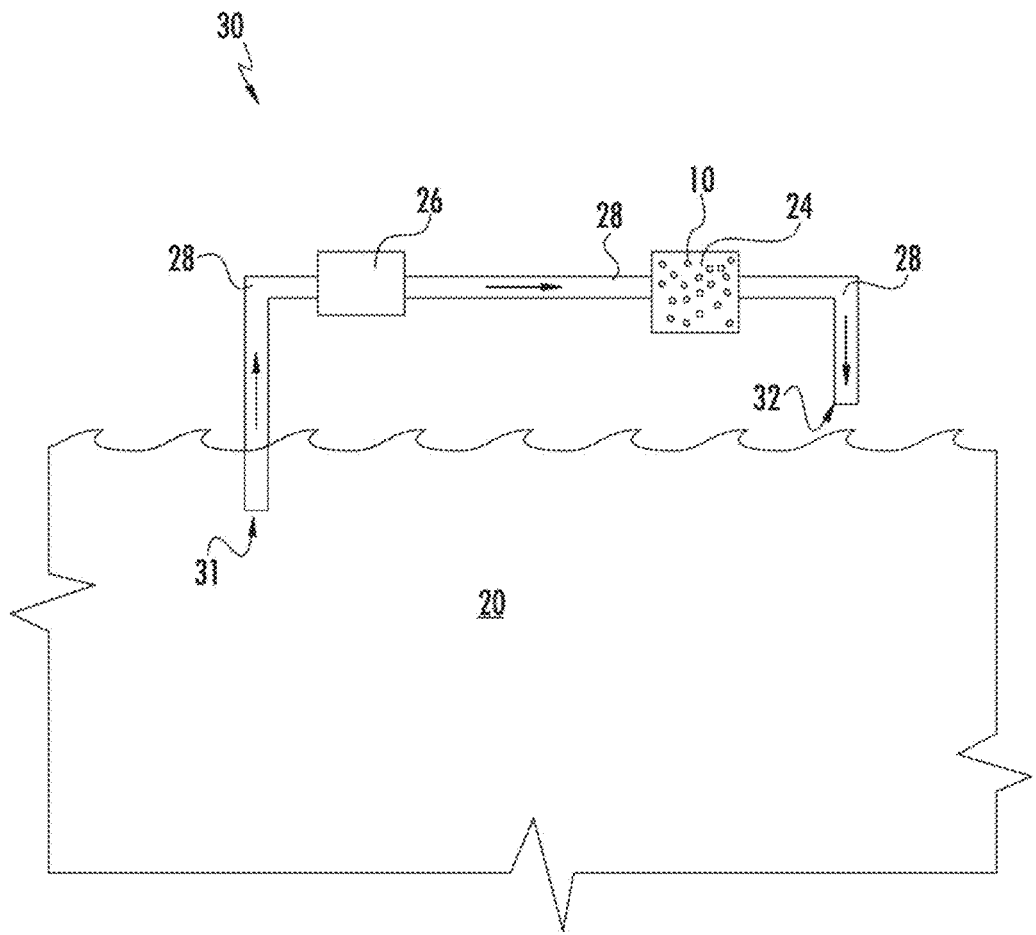
FIG. 9 shows a multiphasic liquid flowing through a cartridge containing nanoparticles.

In an alternative removal method, the multiphasic liquid can be passed through a cartridge containing a plurality of the nanoparticles. Referring to FIG. 9, an exemplary system 30 is shown flowing the multiphasic liquid 20 through a cartridge 24 containing the nanoparticles 10. In the exemplary system 30 shown, The multiphasic liquid 20 is generally pumped into an inlet 31 through the piping 28 (utilizing a pump 26) through the cartridge 24 and returned to the multiphasic liquid 20 via outlet 32.

IV. Recovering the Oil Adsorbed by the Polymeric Shell

The oil adsorbed from the multiphasic liquid can be recovered from the collected nanoparticles after removal from the multiphasic liquid. For example, a sonication or solvent extraction method can be utilized to remove the oil from the collected nanoparticles, which indicates that the oil is held by the PVP-based polymer through non-covalent bonding.

EXAMPLES

Material Synthesis

In this study, iron oxide NPs were synthesized using hydrothermal flow-through (FT) and batch syntheses techniques in ambient environmental condition. Ferrous chloride, ferric chloride, and PVP were used as precursors and ammonium hydroxide was used as precipitating agent in both syntheses processes. FIG. 1a shows the schematic of a typical batch process. In a typical batch process, first, 0.18 mmol of PVP (Mw 10 kDa, Sigma-Aldrich) was added to 6.25 mL ultrapure water while the solution was stirred at 90° C. Then, 1 mmol $FeCl_2.4H_2O$ (98%, Alfa Aesar) and 4 mmol $FeCl_3.6H_2O$ (>98%, BDH) were added to the solution keeping the temperature constant at 90° C. Then, 0.12 mmol PVP was dissolved in the solution followed by addition of 6.25 mL ammonium hydroxide (28-30%, BDH) dropwise with vigorous stirring for next 25 mins at 90° C. The detail of batch synthesis process is explained in U.S. patent application Ser. No. 14/627,056.

A schematic of a typical flow-through synthesis is shown in FIG. 1b. In the flow through method, the batch conditions were transposed to a flow through situation where PVP and iron (II, III) chloride are dissolved in ultra-pure water at 90° C. and then pumped continuously into the reaction chamber of 0.1 inch internal diameter and 2.5 m long Tygon tubing. The reaction chamber was also kept at 90° C. inside a water bath. In the same time, ammonium hydroxide at room temperature was injected continuously in to the reaction chamber with the same flow rate as precursor solution followed by collection of black precipitates of iron oxide NPs in continuous stream.

The iron oxide NPs were washed once with deionized water and magnetically separated and redispersed in water again via sonication.

Characterization

As-synthesized iron oxide NPs are characterized using various techniques such as X-ray powder diffraction (XRD), Atomic Force Microscopy (AFM), and Dynamic Light Scattering (DLS). Powder X-ray diffraction (XRD) was performed on a Rigaku D/max 2100 diffractometer (Cu Kα radiation, λ=1.54059 Å). A NIST $Al_2O_3$ standard was analyzed to determine the instrumental broadening. AFM images for NPs were collected on an Asylum Cypher AFM operating in noncontact mode in ambient air. Noncontact mode silicon AFM cantilevers (ACM240™, Olympus) were used for the characterization. To prepare the AFM samples, first, about 50 μL of sample solution was dropped on a freshly cleaved mica sheet and washed several times with ultrapure water. The mica was then allowed to dry in a covered Petri dish under ambient conditions. For each sample, between 40 and 80 particles were imaged and their heights above the mica surface measured from randomly selected areas of the mica. The measured heights (particle size) were classified into intervals of 10 nm width for all the samples. DLS measurement was performed on a Malvern Nanosizer instrument (pH 6-8). DLS measurements were repeated three times at 25° C. after 2 min equilibrium time to stabilize sample temperature.

Oil Removal Experiments

The oil removal experiment was carried out with 0.15 g/L oil-water mixture. The oil was dispersed in de-ionized (DI) water and oil removal experiment was performed in synthetic sea water to mimic the natural oceanic condition with or without FA or AA (0-10 ppm). FA and AA are typical natural organic macromlecules (NOM) present in ocean water. The synthetic sea water was prepared as per the U.S. Environmental Protection Agency protocol (EPA-821-R-02-012)22. Crude oil representative of the BP Deepwater Horizon spill (sample ID: A0068H, Aecom Environment) was used to prepare the oil-water mixture for our oil removal experiment. The crude oil was mixed with the required amount of DI water in a vial following the sonication of the mixture for 25 mins. Then, appropriate amount of iron oxide NPs were added to make the oil-water-NPs solutions that contains 17.6 ppm of iron oxide NPs for both batch and flow-through syntheses, although up to about 800 ppm can be used (e.g., about 10 ppm to about 800 ppm). Then, Oil-water-NPs solutions were subjected for magnetic separation of NPs using a 1½ in. cubic neodymium magnet (Grade N 52, K&J Magnetics Inc.) for 1 hour. After separation complete, the remaining oil—water solution in each vial was collected for further characterization.

Concentration of oil was measured using 3D fluorescence spectroscopy and gas chromatography-mass spectrometry (GC-MS). Fluorescence spectroscopy measurement was performed by Horiba Jobin Yvon Fluorolog-3 spectrofluorometer to estimate the overall oil removal efficiency. Emission spectra of oil samples were recorded at excitation wavelength of 337 nm as it has been widely used for detecting polycyclic aromatic hydrocarbons (PAHs) in crude oil. Oil concentrations and hence oil removal efficiency were calculated using a calibration plot based on known oil concentration samples from the fluorescence spectroscopy and the integration of the fluorescence spectrum for oil samples before and after magnetic separation. GC-MS analysis was used to calculate removal efficiency of individual alkanes. For DC-MS analysis, Methyl tertiary butyl ether (MTBE) was used to extract oil from the water and NPs. GC-MS analysis was performed on an Agilent 6890N gas chromatography system and an Agilent 5975 mass spectrometer equipped with an auto sampler (Agilent 7683B).

Result and Discussion

Characterization of Iron Oxide NPs

In the previous work described in described in U.S. patent application Ser. No. 14/627,056, PVP-coated iron oxide NPs were synthesized at batch scale using hydrothermal synthesis technique and successfully applied for oil removal at laboratory scale. In this work, the continuous hydrothermal flow-through synthesis of PVP-coated iron oxide NPs were synthesized that transpose the batch conditions and performed the comparative study of both syntheses techniques. The advantage is that this method allows for suitable scale-up of production using an entirely different engineering system.

Crystal structure characterization of as-synthesized iron oxide NPs were performed using XRD. FIG. 2 shows the XRD profile of iron oxide NPs synthesized from batch and flow-through processes. All the peaks in the XRD patterns for both samples can be assigned to cubic magnetite phase (PDF 01-075-0449) of iron oxide. Presence of no additional peaks confirms the phase purity of NPs produced from both syntheses techniques.

Figure 3A:
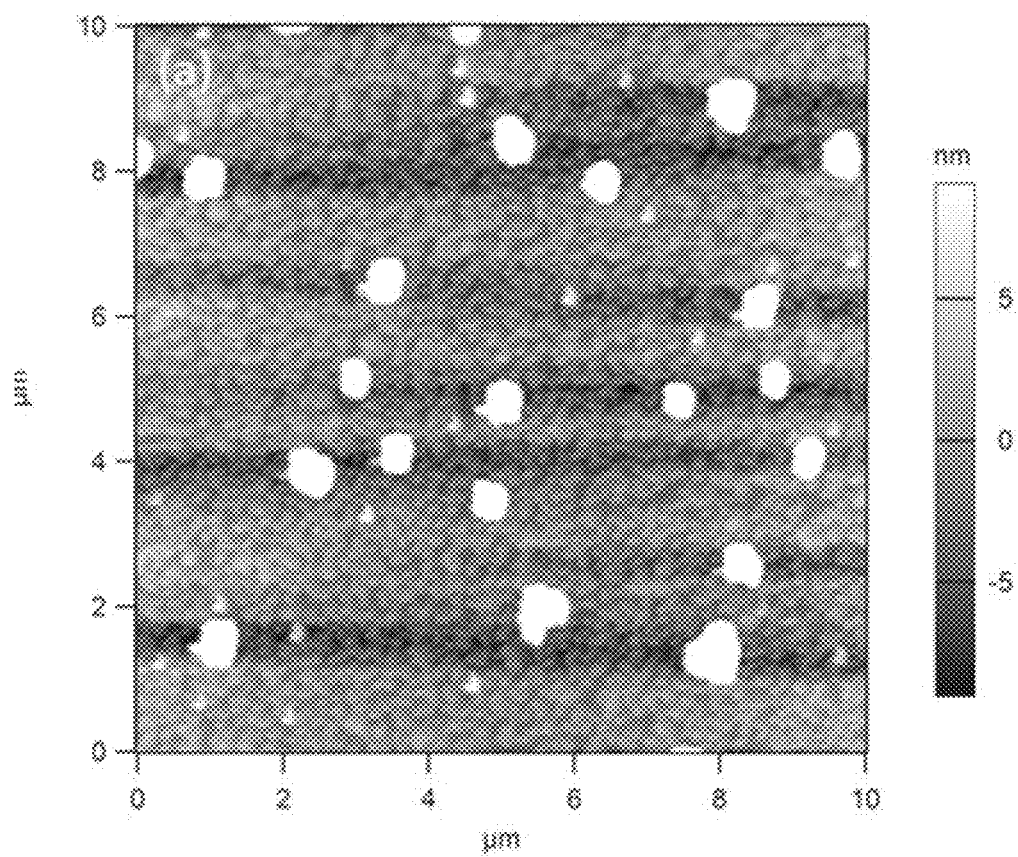
FIG. 3a shows a topographical AFM image for size characterization of NPs produced from a batch synthesis according to the Examples (as in FIG. 1a).
Figure 3B:
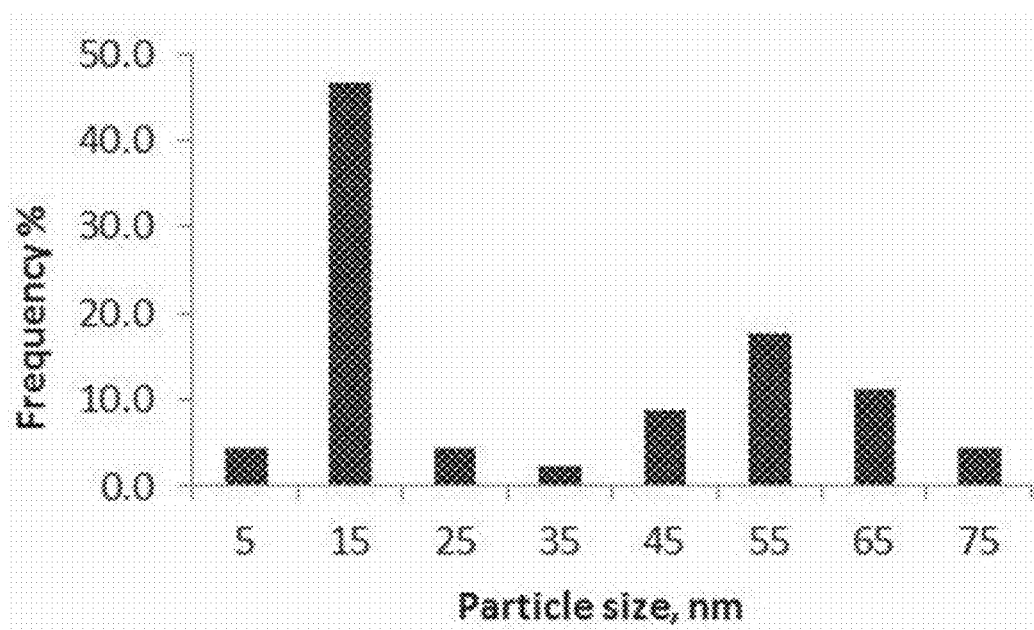
FIG. 3b shows a size distribution histogram from AFM (number of size measurement=45, (interval of 10 nm)) from a batch synthesis according to the Examples (as in FIG. 1a).
Figure 3C:
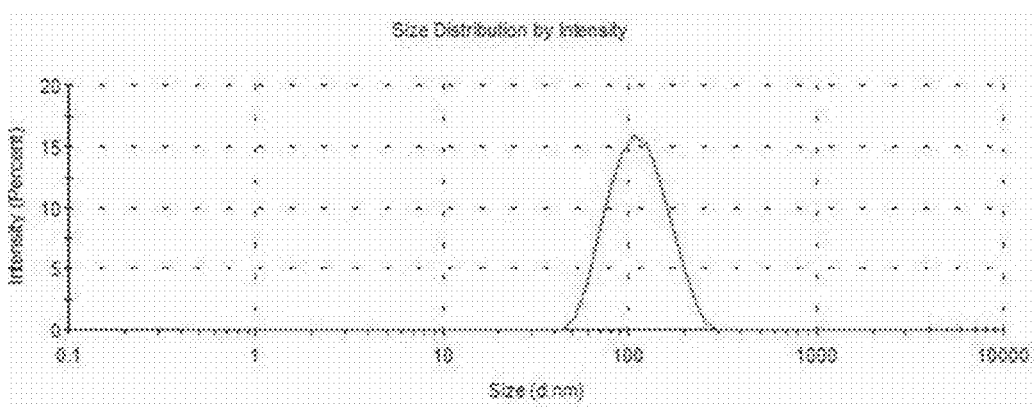
FIG. 3c shows a dynamic light scattering (DLS) size distribution plot from a batch synthesis according to the Examples (as in FIG. 1a).
Figure 4A:
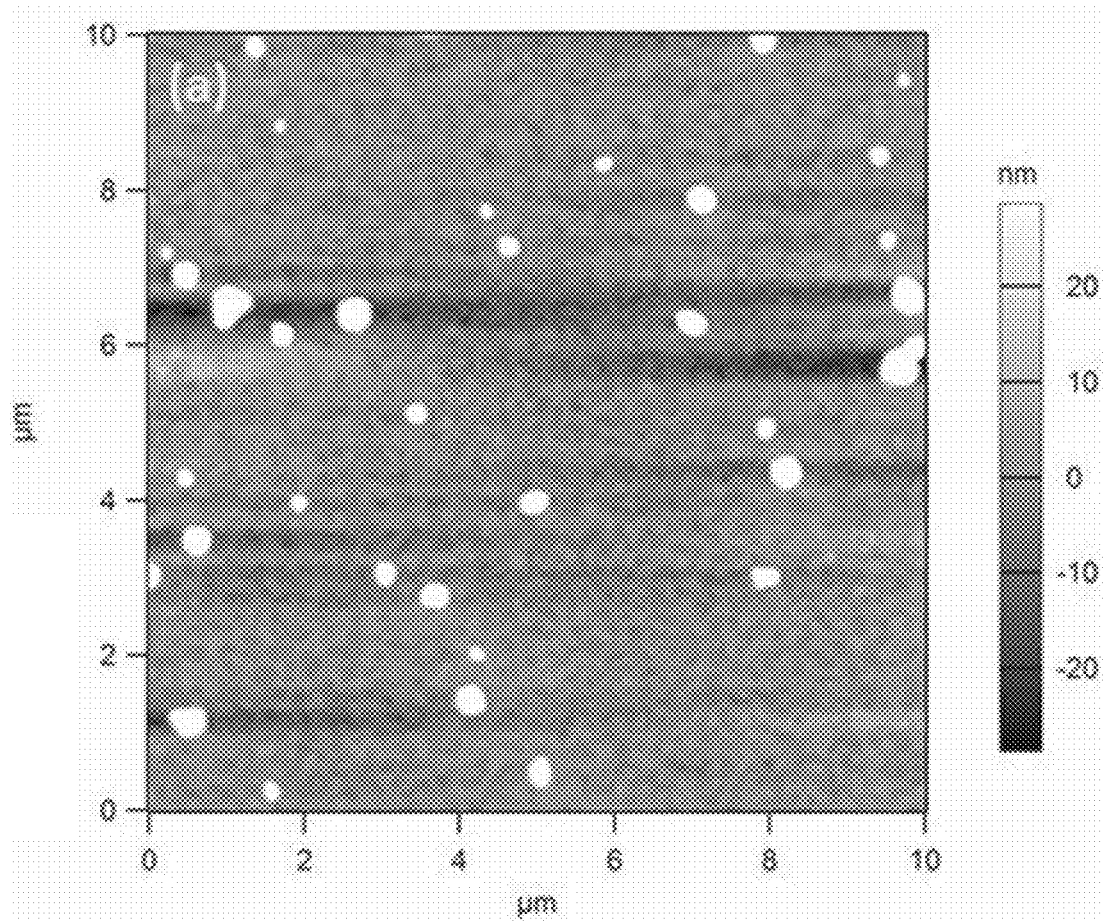
FIG. 4a shows a topographical atomic force microscopy (AFM) image for size characterization of NPs produced from a flow-through synthesis according to the Examples (as in FIG. 1b).
Figure 4B:
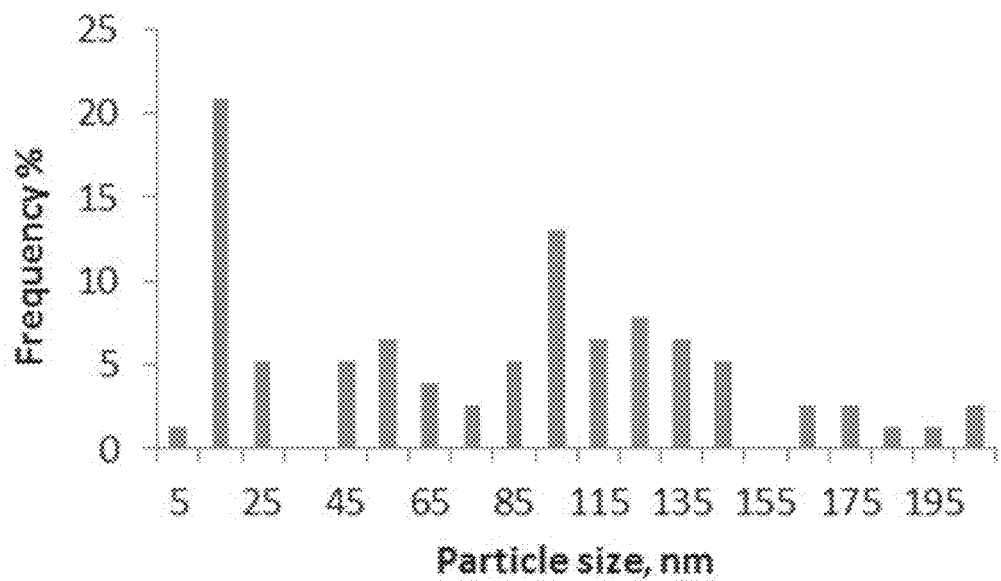
FIG. 4b shows a size distribution histogram from AFM (number of size measurement=77, (interval of 10 nm)) from a flow-through synthesis according to the Examples (as in FIG. 1b).
Figure 4C:
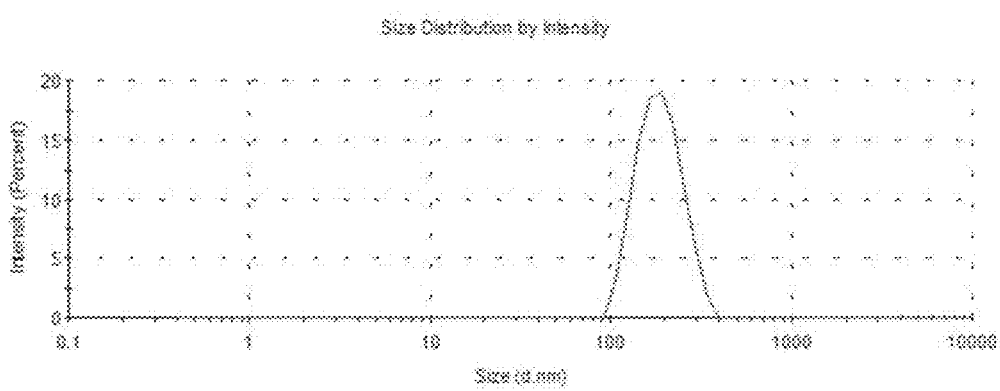
FIG. 4c shows a DLS size distribution plot from a flow-through synthesis according to the Examples (as in FIG. 1b).

Size characterization of both iron oxide NPs samples were carried out using AFM and DLS measurement. FIG. 3a shows the AFM scan images of PVP-coated iron oxide NPs synthesized from batch process and size distribution of NPs from AFM and DLS analyses. The AFM image and size-distribution analysis (FIGS. 3a and 3b) shows the median particle size of NPs was 28.9 nm. The hydrodynamic diameter of the NPs measured by DLS was 93.3 nm with an average polydispersity index (Pdi) of 0.20, as shown in FIG. 3c. Both AFM and DLS data suggested that NPs were reasonably dispersed. FIGS. 4a and 4b shows the AFM image and particle size distribution, respectively, of NPs produced from flow-through synthesis technique. Based on the particle size distribution analysis, the median particle size of NPs was 81.89 nm. FIG. 4c is the DLS size distribution plot, which shows hydrodynamic diameter of NPs is 173.2 nm with Pdi of 0.18. Though Pdi is still low for these NPs, some agglomeration of NPs can be seen in AFM image that may have contributed to the larger particle size for NPs from flow-through synthesis compared to NPs from batch synthesis.

Oil Removal Experiment

In the previous work described in described in U.S. patent application Ser. No. 14/627,056, the oil removal efficiency was investigated with different NPs concentration and it was found that 17.6 ppm of NPs concentration was the optimized concentration to yield almost 100% removal of oil. In this work, the oil removal experiments were generally performed with oil samples containing 18 ppm of iron oxide NPs, although other concentrations were used.

Figure 5A:
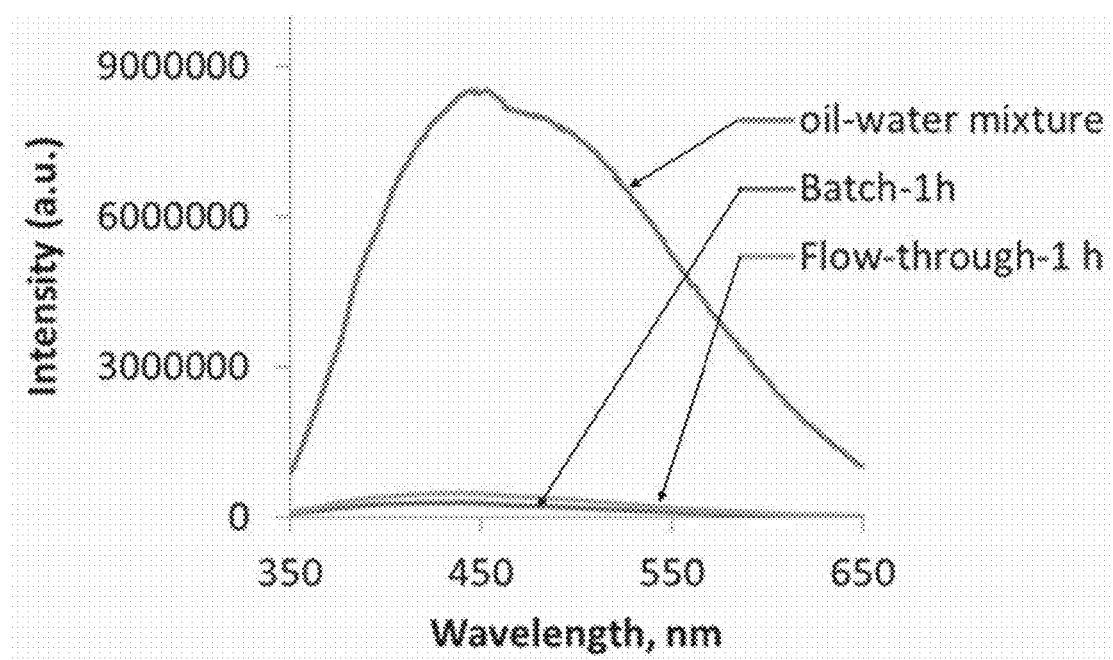
FIG. 5a shows the fluorescence spectra for the solutions remaining after oil removal for the NPs an oil removal experiment in sea-water.
Figure 5B:
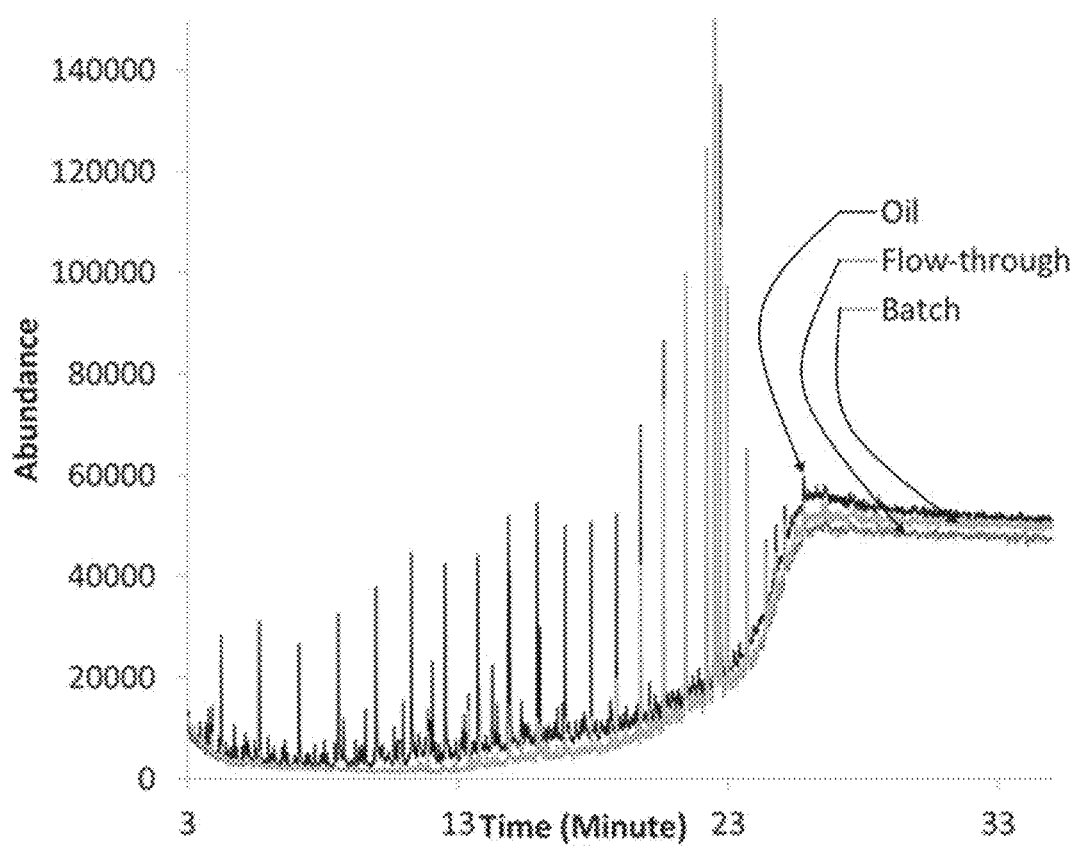
FIG. 5b shows chromatogram results from GC-MS for the oil removal experiment in sea-water.
Figure 5C:
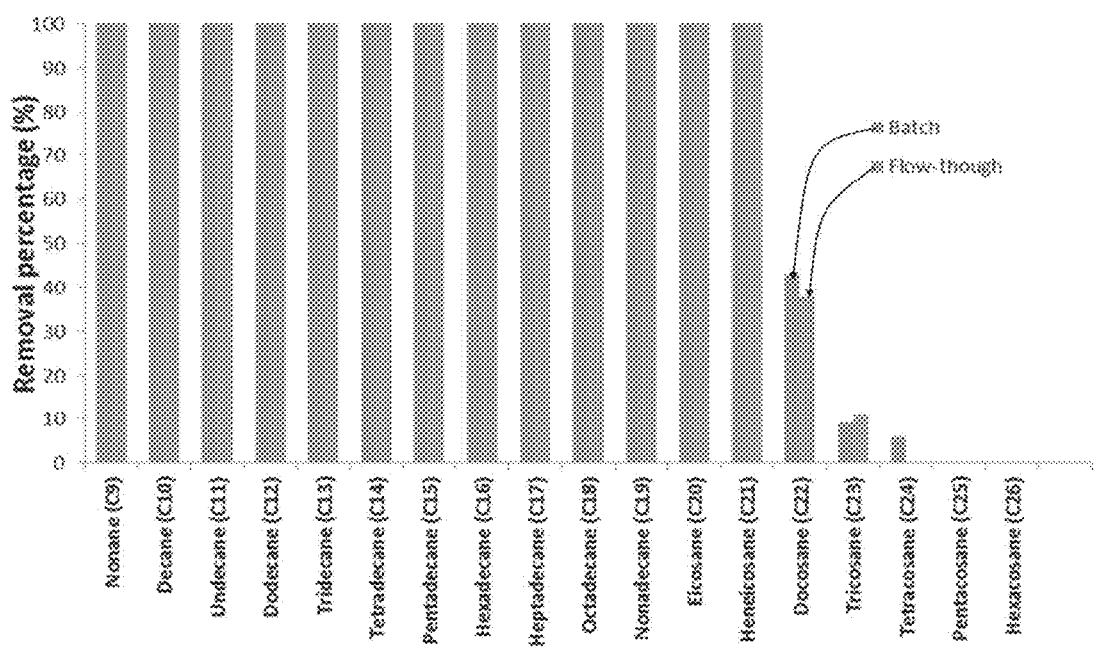
FIG. 5c shows chromatogram results from GC-MS mass spectrometry for the oil removal experiment in sea-water.

FIG. 5a shows the fluorescence spectra of oil removal experiment in sea-water with NPs from batch and flow-through syntheses after 1 h of magnetic separation. From the analysis of the fluorescence spectra, almost 100% oil removal was achieved for the NPs from each synthesis process. Based on GC-MS results, chromatogram peaks for oil remaining samples were significantly reduced after 1 h of magnetic separation compared to the initial oil—water mixture, as shown in FIG. 5b. The GC-MS (FIG. 5c) results show the 100% removal of lower chain alkanes C9-C21 and about 40% removal of higher chain alkanes by the NPs from both batch and flow-through syntheses. The results from oil separation experiment indicate that NPs from flow-through synthesis process were as efficient as NPs from batch synthesis in terms of oil removal capacity.

Figure 6A:
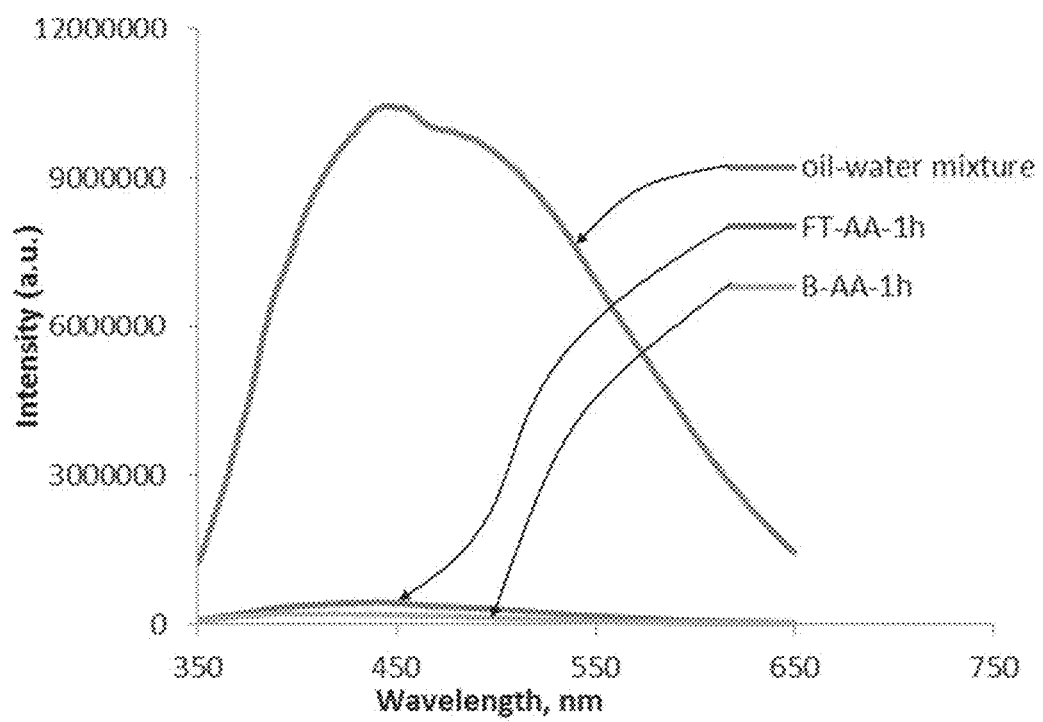
FIG. 6a shows a fluorescence spectra for the solutions remaining after oil removal for the NPs from batch and flow through syntheses with alginic acid.
Figure 6B:
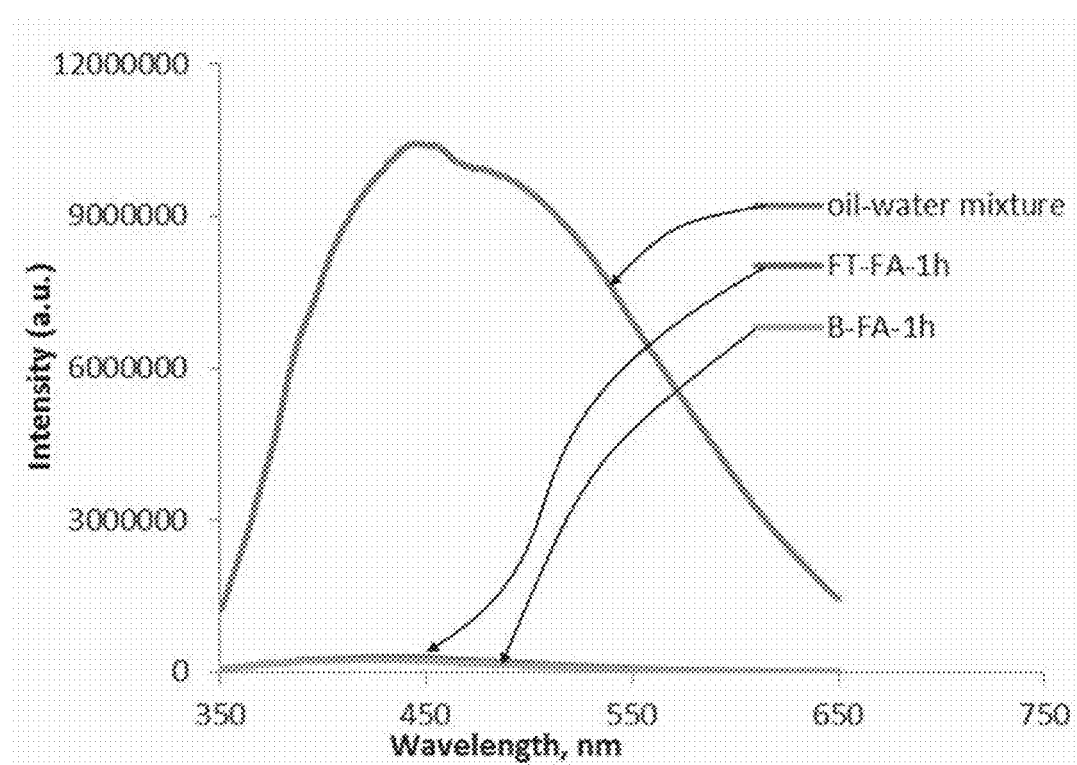
FIG. 6b shows a fluorescence spectra for the solutions remaining after oil removal for the NPs from batch and flow through syntheses with fulvic acid in sea-water.

Oil separation experiment was repeated with the presence of 1 ppm of FA or 1 ppm of AA in sea-water with the same concentration of iron oxide NPs (18 ppm) to better mimic the natural sea-water. FIGS. 6a and 6b show the fluorescence spectra of oil experiment in sea-water in the presence of FA and AA. FIG. 6(a) is the fluorescent spectra of the oil experiment in sea-water in the presence of AA, which indicates almost 100% removal efficiency of NPs from both syntheses processes. The result from fluorescence spectra of the oil removal experiment with the presence of FA (FIG. 6b) also indicates almost 100% removal efficiency of NPs. The result showed an excellent oil removal efficiency (almost 100%) for NPs in presence of FA and AA, which is consistent with our previous work using the batch-produced NPs. The result indicates no change in oil removal efficiency with or without FA and AA as NOM interaction with PVP polymer is minimal. This confirms the excellent oil removal capacity of our iron oxide NPs in natural sea-water conditions.

The overall results from oil experiment indicate that for all experiment even with FA and AA, which act to retard the NP effectiveness, the iron oxide NPs produced from flow-through synthesis were equally efficient for oil separation as compared to NPs produced from batch process.

CONCLUSION

PVP-coated iron oxide NPs were synthesized using a novel hydrothermal flow-through technique under ambient pressure. The structural properties and oil removal efficiency of as synthesized NPs were compared with the NPs synthesized from batch process under similar condition. The NPs synthesized from the flow-through technique showed good control on their structural properties as compared to NPs from batch process. Most significantly, NPs from flow-through synthesis showed the excellent oil removal efficiency as well. This finding will allow the production of a massively parallel flow-through process for the scaled-up production of iron oxide NPs that could be used for in-situ oil remediation from the oil spills as big as BP Deepwater Horizon.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A method of making a plurality of nanoparticles via a continuous flow-through process, the method comprising:
    continuously flowing a first component of a core and a polymeric material into a reaction chamber, wherein the first component of the core and the polymeric material are first dissolved in water free of organic solvents, wherein the polymeric material is polyvinylpyrrolidone; and
    continuously flowing a second component of the core into the reaction chamber such that the first component reacts with the second component to form a core, wherein the polymeric material forms a polymeric shell around the core, wherein the reaction chamber has a temperature of about 60° C. to about 120° C. when the polymeric material, the first component of the core, and the second component of the core are supplied into the reaction chamber.

2. The method of claim 1, wherein the reaction chamber has a temperature of about 80° C. to about 100° C.

3. The method of claim 1, wherein the first component is a metal salt.

4. The method of claim 3, wherein the metal salt comprises an iron chloride.

5. The method of claim 4, wherein the iron chloride comprises $FeCl_2$, $FeCl_3$, or a mixture thereof.

6. The method of claim 3, wherein the second component is an oxygen source.

7. The method of claim 6, wherein the oxygen source comprises ammonium hydroxide.

8. The method of claim 6, wherein the core comprises a metal oxide.

9. The method of claim 8, wherein the metal oxide comprises iron oxide, silica, alumina, indium tin oxide, titania, or a mixture thereof.

10. The method of claim 1, wherein the core precipitates from the water after reaction of the first component and the second component.

11. The method as in claim 1, wherein the polyvinylpyrrolidone has a molecular mass of about 10 kDa to about 360 kDa.

12. The method as in claim 1, wherein the core is magnetic.

13. The method as in claim 1, wherein the core has an average size that about 100 nm or less.

14. The method as in claim 1, wherein the core has an average size of about 15 nm to about 50 nm.

* * * * *